United States Patent [19]

Leiber

[11] Patent Number: 4,821,606
[45] Date of Patent: Apr. 18, 1989

[54] ARRANGEMENT FOR AUTOMATICALLY SHIFTING VEHICLE AGGREGATES OF A MOTOR VEHICLE

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 84,432

[22] Filed: Aug. 12, 1987

[30] Foreign Application Priority Data

Aug. 13, 1986 [DE] Fed. Rep. of Germany ....... 3627549

[51] Int. Cl.⁴ .............................................. B60K 43/00
[52] U.S. Cl. ................... 74/866; 364/424.1; 180/197
[58] Field of Search ................ 74/856, 866; 180/197; 364/424.1

[56] References Cited

U.S. PATENT DOCUMENTS

| | | | |
|---|---|---|---|
| 4,417,641 | 11/1983 | Kageyama | 180/233 X |
| 4,484,280 | 11/1984 | Brugger et al. | 364/426 |
| 4,511,014 | 4/1985 | Makita | 180/233 |
| 4,519,275 | 5/1985 | Maruyama et al. | 74/866 |
| 4,566,554 | 1/1986 | Suzuki | 180/249 |
| 4,679,145 | 7/1987 | Beeck et al. | 364/424.1 |
| 4,691,284 | 9/1987 | Izumi et al. | 280/703 X |
| 4,692,866 | 9/1987 | Kosuge | 74/866 X |
| 4,704,541 | 11/1987 | Leiber | 180/197 X |

Primary Examiner—David A. Scherbel
Assistant Examiner—Creighton Smith
Attorney, Agent, or Firm—Barnes & Thornburg

[57] ABSTRACT

An arrangement for the automatic shifting of vehicle aggregates such as a drive slippage-regulating system, an automatic transmission, shock absorbers for the adaptation to different driving manners of drivers, such as fuel saving, "sporty" etc., which includes a logic circuit in which signals coordinated to the drive pedal, the vehicle cross acceleration, the steering angle and the driving velocity are evaluated and are processed into control signals for shifting the vehicle aggregates.

17 Claims, 1 Drawing Sheet

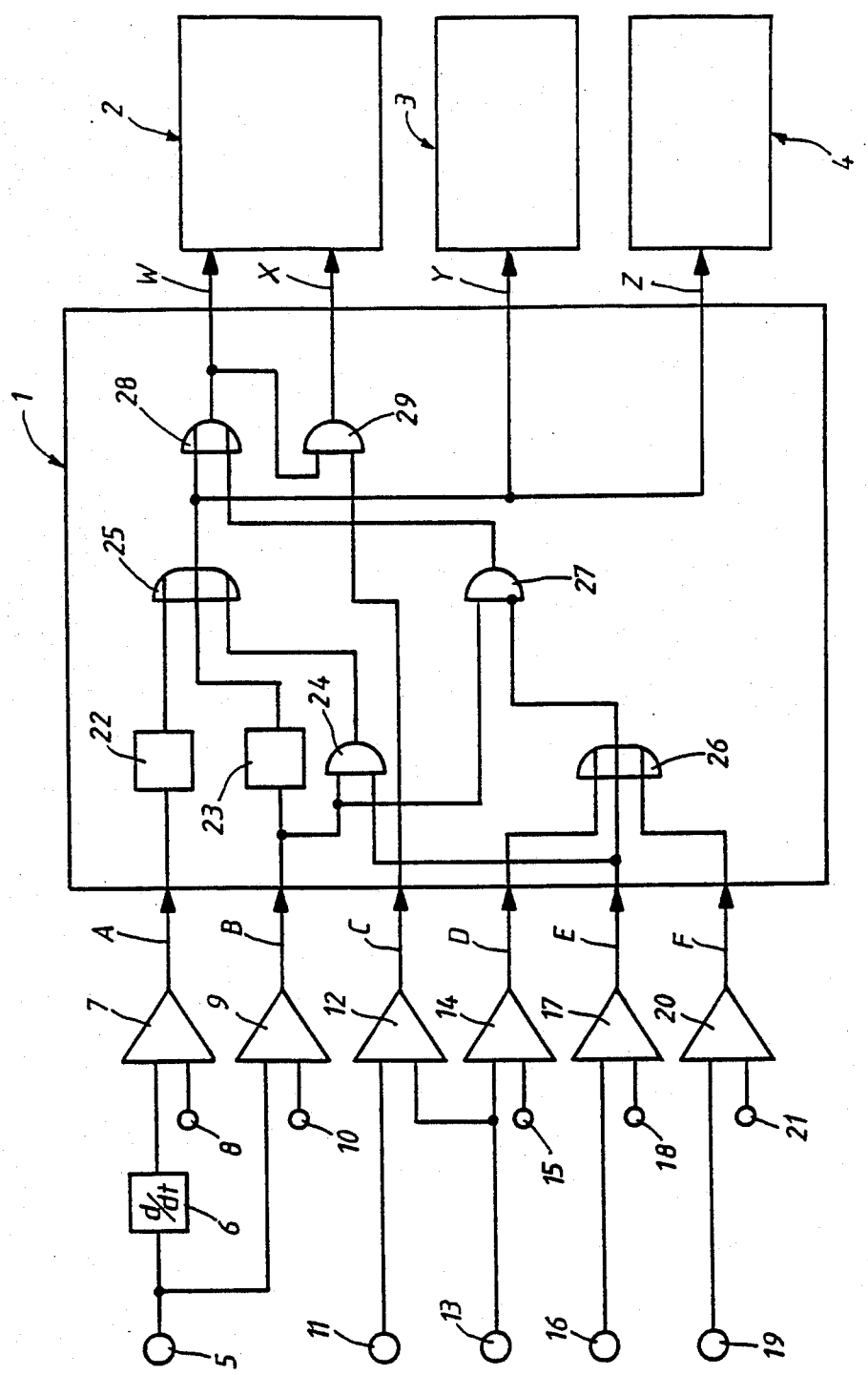

ARRANGEMENT FOR AUTOMATICALLY SHIFTING VEHICLE AGGREGATES OF A MOTOR VEHICLE

BACKGROUND AND SUMMARY OF THE INVENTION

The present invention relates to an arrangement for automatically shifting vehicle aggregates, especially for the adaptation to different driving manners of drivers of a motor vehicle.

For example, with electronically controlled transmissions in motor vehicles, it is known to select the shifting points, i.e., the rotational speeds at which a higher or lower speed is engaged when exceeding or dropping below the same, corresponding to the desired driving manner by means of a hand-actuated switch (DE-PS No. 23 38 122). Such driving manners are, for example, fuel-consuming, normal, sporty, etc.

It is also known to change the damping characteristics of the shock absorbers by means of a manually actuated switch from soft by way of medium to hard and vice versa.

With a drive slippage regulation it is known to switch the same from "select high" to "select low" when reaching a predetermined vehicle velocity. "Select high" means to reduce the driving torque of the vehicle engine when both wheels of the driven axle exceed a predetermined slippage threshold.

By contrast in "select low", the driving torque is already reduced when only one driven wheel exceeds the slippage threshold. However, the shifting to "select low" takes place thereby generally at a driving velocity of about 40 km/h, independently of the driving manner of the driver. With a sporty driving manner, the maximum traction is limited with this design of the driving slippage regulation. It is therefore not possible in this case, for example, to drive fast through a curve by oversteering the vehicle.

It is therefore the object of the present invention to provide an arrangement for the automatic shifting of vehicle aggregates which is capable to undertake the shifting automatically corresponding to the driving manner of the driver.

The underlying problems are solved according to the present invention in that a logic circuit is provided to which are fed at least one of the following signals which indicate (a) exceeding at least one predetermined value of the actuating velocity of the drive pedal, (b) the full load position of the drive pedal, (c) exceeding at least one predetermined value of the vehicle cross-acceleration, (d) exceeding at least one predetermined value of the steering angle, and/or (e) exceeding at least one predetermined value of the driving velocity, and which produces from this signal/these signals control signals for shifting the vehicle aggregates into operating conditions coordinated to the respective driving manner.

The advantage of the present invention resides in that by an evaluation of different input signals, the instantaneous driving manner of the respective driver can be determined and an adaptation of the shiftable vehicle aggregates to this driving manner can be carried out automatically without the need for the driver to become active.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

The single figure is a schematic block diagram of an arrangement in accordance with the present invention.

DETAILED DESCRIPTION OF THE DRAWING

One embodiment according to the present invention is schematically illustrated in the drawing. This example relates to a motor vehicle in which a drive slippage-regulating system, an electronically controlled automatic change-speed transmission as well as the shock absorbers are constructed to be automatically shiftable. With the mentioned drive slippage-regulating system, the slippage thresholds are shiftable from a lower to a higher slippage value and the operating condition can be shifted between "select low" and "select high". With the mentioned automatic change-speed transmission, the rotational speed ranges coordinated to the individual transmission speeds are shiftable from low shifting-up and shifting-down rotational speed threshold values to higher shifting-up and shifting-down rotational speed threshold values and finally the mentioned shock absorbers are shiftable from a soft spring/damping characteristic to a harder characteristic. This simple shifting between respectively two conditions is selected herein for reasons of simplicity of illustration of the embodiment. In practical realizations, however, more aggregates may be present each with more than two shiftable conditions. Also, more or different input magnitudes may be used than those provided in the following embodiment.

The essential part of the shifting arrangement in accordance with the present invention is a logic circuit generally designated by reference numeral 1 which evaluates digital input magnitudes fed thereto and to be explained more fully hereinafter and combines the same to digital control signals for shifting of vehicle aggregates. These vehicle aggregates are, as already mentioned, a drive slippage-regulating system 2, an electronically controlled transmission 3 and the shock absorbers 4.

A sensor 5 connected with the drive pedal (not shown) of the vehicle, for example, a potentiometer, produces an analog signal corresponding to the drive pedal position. This signal is fed by way of a conventional differentiating element 6 to a comparator 7 and is compared therein with a fixed value 8 which is also fed to the comparator. The output signal of the differentiating element 6 is a signal proportional to the velocity of the drive pedal which indicates the abruptness and roughness of the driver as concerns his demands for acceleration and deceleration and indicates conclusions as to the driving manner of the driver. When an actuating velocity of the drive pedal predetermined by the fixed value 8 is exceeded, a digital output signal A, an H-signal is produced in the comparator 7. It is to be generally understood that in this application signals are H-signals. No signal means therefore an "L-signal".

The output signal of the sensor 5 is additionally fed to a comparator 9 in which it is compared with a fixed value 10. This fixed value is so high that a digital output signal B appears at the output of the comparator 9 when the drive pedal is in its end (full load) position which is known as the "kick-down" position.

An analog signal is fed to an input 11, whose amplitude corresponds to an instantaneous value of the vehicle cross acceleration calculated, for example, from the driving velocity and steering angle according to a known method (DE-OS No. 35 45 715). This signal is fed to a comparator 12 and is compared therein with an instantaneous value measured in a cross-acceleration sensor 13. The comparator 12 produces a digital output signal C when the calculated instantaneous value exceeds the measured instantaneous value of the cross-acceleration.

The output signal of the cross-acceleration sensor 13 is fed to a further comparator 14 and is compared therein with a fixed value 15, which corresponds, for example, to a cross acceleration of 0.1 g. If the output signal of the cross-acceleration sensor 13 exceeds this fixed value 15, then the comparator 14 produces a digital output signal D.

The output signal of a steering angle sensor 16 is compared in a comparator 17 with a fixed value 18. If the instantaneous steering angle of the vehicle, respectively, to the steered wheels measured by means of the steering angle sensor, exceeds this fixed value 18, then the comparator 17 produces an output signal E.

Finally, a driving velocity transmitter 19 is provided whose output signal is compared in a comparator 20 with a fixed value 21 that corresponds, for example, to a driving velocity of 100 km/h. If the instantaneous driving velocity exceeds this value, the comparator 20 produces an output signal F.

The signals A to F form the input magnitudes for the logic circuit 1. The evaluation and logic combination of these signals will be described hereinafter.

The signal A reaches the input of an integrator with a series-connected threshold comparator which form a unit and will be referred to hereinafter as first integrator 22. This first integrator 22 produces a digital output signal when signal A occurs several times within a predetermined time interval, i.e., when the drive pedal within this time interval is actuated several times with the predetermined actuating velocity or more rapidly.

Signal B reaches the input of a second integrator 23 which has the same construction as the first integrator 22 and produces a digital output signal when signal B appears several times within a predetermined time interval or has a predetermined duration, i.e., when the drive pedal reaches within this time interval several times the full load position or maintains the same for a predetermined duration.

Furthermore, an AND-element 24 is provided, to one input of which is fed the signal E and to the other input of which is fed the signal B and which produces an output signal when both these input signals are present at the same time, i.e., when the drive pedal is in the full gas position and a predetermined steering angle has been reached or exceeded.

The outputs of the first integrator 22, of the second integrator 23, and of the AND-element 24 are connected with one input each of a first OR-element 25.

The signals D, E and F are fed to one input each of a second OR-element 26 whose output is connected with the inverting input of an AND-NOT-element 27. Signal B is fed to the non-inverting input of the AND-NOT-element 27. Consequently, a signal appears in the output of the AND-NOT-element 27 when the driving pedal is in the full load position and at the same time neither the cross acceleration threshold 15 nor the steering angle threshold 18 nor the driving velocity threshold 21 are exceeded.

The outputs of the first OR-element 25 and of the AND-NOT-element 27 are connected with one input each of a third OR-element 28 whose output signal is the control signal W for shifting the drive slippage-regulating system 2 into the "select high" position. The output signal of the first OR-element 25 is at the same time the control signal Y for shifting the automatic transmission 3 to higher rotational speed thresholds and the control signal Z for shifting the shock absorbers to "hard".

Additionally, a still further AND-element 29 is provided whose one input is connected to the third OR-element 28 and to the second input of which is fed the signal C. The output signal of this AND-element 29 is a control signal X for shifting the drive slippage-regulating system 2 to higher slippage thresholds. This control signal X is only produced when a "select high" shifting takes place and at the same time the calculated cross-acceleration is higher than the measured one.

As stipulated, the vehicle aggregates have each two automatically shiftable operating conditions. Manual shifting or, for example, the automatic shifting of the drive slippage-regulating system to "select low" at a vehicle velocity above about 40 km/h may also be provided but have not been taken into consideration herein.

If none of the control signals W to Z is present, then the drive slippage-regulating system 2 is in its "select low" position with low slippage thresholds, low shift-up, shift-down rotational speed threshold values are effective in the automatic transmission 3 and the shock absorbers 4 are adjusted to "soft". Such an adjustment of the aggregates enables a fuel-saving, comfortable driving manner. If the control signals W, Y and Z are present with or without control signal X, i.e., the drive slippage-regulating system 2 is in the "select high" position, the transmission 3 has been shifted to high shift-up, shift-down rotational speed threshold values and the shock absorbers 4 have been adjusted to "hard", then this corresponds to a sporty forced driving manner.

Normally, all aggregates are adjusted corresponding to the fuel saving driving manner. If the drive pedal is rapidly actuated several times or if the full load position is reached several times or maintained for longer periods of time or if at full load position a larger steering angle is adjusted, then all of the aggregates are shifted to the position coordinated to the "sporty" driving manner.

If a full load (kick-down) position is present without the registration at the same time of a cross acceleration, of a steering deflection or of greater driving velocities, then only the drive slippage-regulating system is shifted to "select high" in order to enable maximum traction, i.e., maximum propulsion acceleration.

If in case of a sporty driving manner the vehicle drives into a curve, then in general the vehicle understeers. The driver will turn the steering wheel further in order to be able to drive better through the curve. The occurring measured cross-acceleration is in this case smaller than the cross acceleration calculated, inter alia from the steering angle because the vehicle drives through a larger radius than corresponds to the steering angle. In this case, additionally the slippage thresholds of the drive slippage-regulating system are set higher in order to Provide to the driver the possibility to be able to drive faster through the curve by oversteering.

Shifting of the aggregate is maintained for such length of time as the control signals are present. In order to avoid a frequent to-and-fro shifting, it is appropriate to lengthen the control signals in a non-illustrated manner, for example, by means of monostable relaxation (multivibrator) stages.

From the recognition of the driving manner and by the automatic adjustment of the aggregates corresponding to this driving manner, the driving is considerably facilitated and simplified.

While I have described only one embodiment in accordance with the present invention, it is understood that the same is not limited thereto but is susceptible of numerous changes and modifications as known to those skilled in the art, and I therefore do not wish to be limited to the details shown and described herein but intend to cover all the changes and modifications as are encompassed by the scope of the appended claims.

I claim:

1. An arrangement for the automatic shifting of vehicle aggregates for the adaptation to different driving manners of drivers of motor vehicles, including a wheel slip control means for selecting permissible wheel slip settings between "select low" and "select high", and between different slippage thresholds, wherein a logic circuit means includes input means for receiving the following input signals:
    signal A, indicating that a given value of an actuating velocity of a vehicle drive pedal was exceeded;
    signal B, indicating that a full load position of the vehicle drive pedal was reached;
    signal C, indicating that a value of a vehicle cross-acceleration calculated from a vehicle steering angle and driving speed is higher than a measured value;
    signal E, indicating that a given value of the steering angle has been exceeded; and
    wherein said logic circuit means generates from at least one of these input signals, at least one of the following output signals:
    signal W, for the shifting of the wheel slip control system from the "select low" to the "select high" operation;
    signal X, for the shifting of the wheel slip control system from a lower to a higher slippage threshold; and
    wherein said logic control means generates signal W whenever either signal A or signal B exceeds an integrated value, or when signals B and E both appear, and wherein said logic control means generates signal X when signal W and signal C appear at the same time.

2. An arrangement according to claim 1, wherein that the logic circuit means generates an output signal Z for the shifting of the shock absorbers of the vehicle from softer to harded damping values, whenever either signal A or signal B exceeds an integrated value, or when signals B and E appear.

3. An arrangement according to claim 1, wherein the logic circuit means generates an output signal Y for the shifting of the automatic transmission of the vehicle from rotational speed ranges assigned to a fuel-saving manner of driving to rotational speed ranges assigned to a forced-up manner of driving whenever either signal A or signal B exceeds an integrated value when signals B and E appear.

4. An arrangement according to claim 1, wherein the input means also receives the following input signals:
    signal D, indicating that a value of the vehicle cross-acceleration has been exceeded;
    signal F, indicating that a value of the driving speed has been exceeded; and wherein signal W is also produced whenever signal B appears without any of signals D, E or F appearing.

5. An arrangement according to claim 1, wherein the integrated value of signal A occurs when signal A appears for a repeated number of times in a given time frame.

6. An arrangement according to claim 1, wherein the integrated value of signal B appears when signal B either appears for a repeated number of times in a given time frame or lasts for a predetermined period of time.

7. An arrangement according to claim 5, wherein the integrated value of signal B appears when signal B either appears for a repeated number of times in a given time frame or lasts for a predetermined period of time.

8. An arrangement according to claim 1, wherein means are provided for generating the vehicle cross-acceleration signal C is obtained by comparing the actual value of the vehicle cross-acceleration with the calculated value and wherein signal C occurs when the actual value exceeds the calculated value.

9. An arrangement according to claim 1, wherein the means for generating signal C is obtained when actual vehicle cross-acceleration exceeds the calculated value.

10. An arrangement according to claim 1, wherein said logic circuit means includes a first integrator means which produces a signal when signal A appears several times sequentially.

11. An arrangement according to claim 1, wherein said logic circuit means includes a second integrator means which produces a signal when signal B is maintained for a predetermined duration or is reached several times sequentially.

12. An arrangement according to claim 10, wherein said logic circuit means includes a second integrator means which produces a signal when signal B is maintained for a predetermined duration or is reached several times sequentially.

13. An arrangement according to claim 12, wherein said logic circuit means also controls an automatic change-speed transmission provided with rotational speed ranges shiftable for the individual speeds.

14. An arrangement according to claim 13, wherein said logic circuit means also control shock absorber means shiftable in their spring/damping characteristics.

15. An arrangement according to claim 14, wherein an output signal of one of the integrator means effects a "select high" adjustment of the drive slippage-regulating means, a shifting to higher transmission speed rotational speed ranges of the automatic change-speed transmission and a shifting to a harder adjustment of the shock absorber means.

16. An arrangement according to claim 12, wherein the simultaneous occurrence of a signal indicating the full load position of the drive pedal and exceeding a predetermined value of the steering angle effects a "select high" adjustment of the drive slippage-regulating system, a shifting to higher transmission speed-rotational speed ranges of the automatic transmission and a shifting to a harder adjustment of the shock absorber means.

17. An arrangement according to claim 1, wherein said logic control means produces a signal indicating exceeding a predetermined value of the vehicle cross-acceleration for effecting an adjustment to higher slippage thresholds of the drive slippage-regulating means if at the same time a signal is present effecting a "select high" adjustment of the drive slippage-regulating means.

* * * * *